(Model.)
E. J. HART.
GATE POST.
No. 257,322. Patented May 2, 1882.
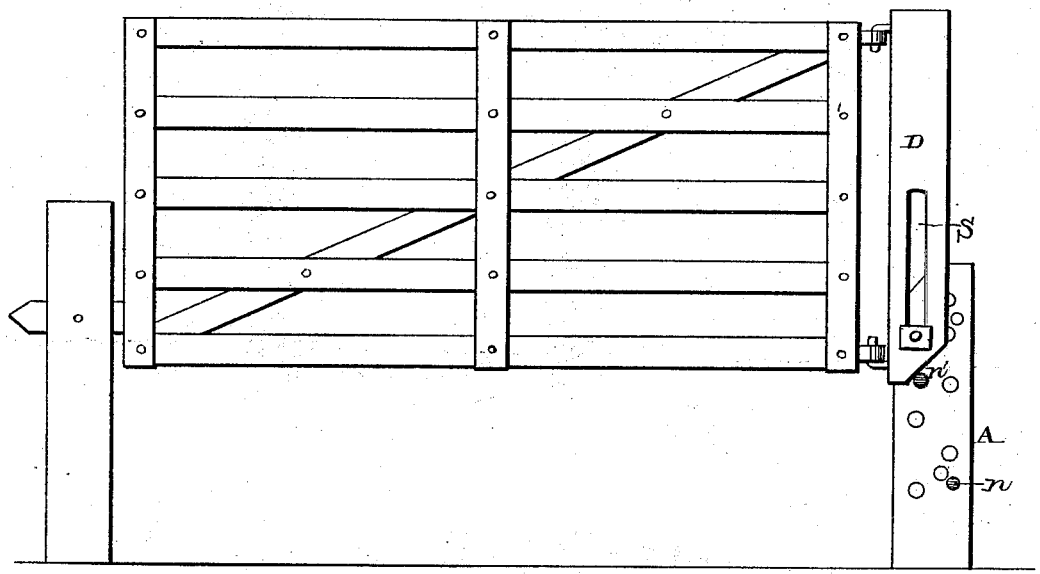
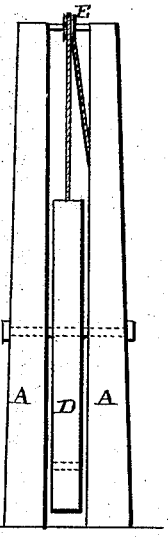
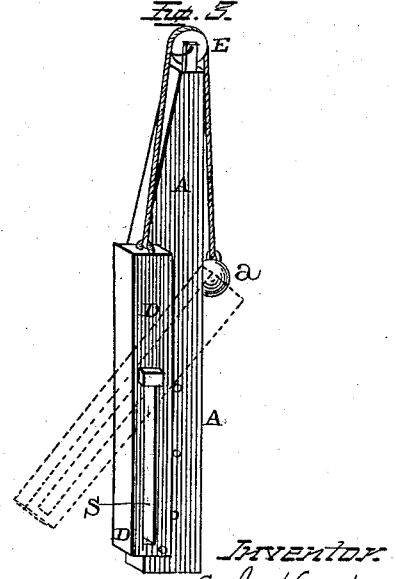
Witnesses.
W. W. Mortimer.
W. H. Kirn.
Inventor.
E. J. Hart
per
F. W. Lehmann,
Att'y

UNITED STATES PATENT OFFICE.

EDWIN J. HART, OF BUTLER, PENNSYLVANIA.

GATE-POST.

SPECIFICATION forming part of Letters Patent No. 257,322, dated May 2, 1882.

Application filed February 14, 1882. (Model.)

*To all whom it may concern:*

Be it known that I, EDWIN J. HART, a citizen of the United States, residing at Butler, in the county of Butler and State of Pennsylvania, have invented certain new and useful Improvements in Gate-Posts, of which the following is a specification, reference being had therein to the accompanying drawings.

My invention relates to an improvement in gate-posts; and it consists in the combination of the main gate-post with a slotted post which is clamped thereto, the slotted post having the gate attached to it and adapted to be adjusted at an angle for the purpose of raising the outer end of the gate, as will be more fully described hereinafter.

The accompanying drawings represent my invention.

Figure 1 is a side elevation of my invention. Figs. 2 and 3 are modifications of the same.

The gate-post A, of the usual form, is fixed in the ground. Through this post are a number of holes at a right angle with the direction in which the gate hangs, of which one is for a bolt, B, that serves as a support or pivot of the piece D, and the others for guides to hold the piece D either in a vertical or slanting position, as may be required.

On top of the post A, when high enough for the purpose, is a pulley, E, over which passes a rope or chain, with one end attached to the upper part of the movable piece D and the other to a balancing-weight, $a$. If, however, the post A is not of a height to admit of this arrangement, the pulley can be dispensed with and the piece D be raised by other means.

The piece or bar D is movable and of sufficient thickness to allow the gate to be hinged at one of its sides, and of a width for a slot, S, to be made through its center, extending from near its lower end upward to the middle of the piece. The gate is hung at the side of the piece D, as shown, and consequently raised or lowered with it.

A bolt, B, passing through the post A and through the slot S from the rear, has a nut in front, which, when loosened, allows the piece D, with the gate, to be shifted up or down or to be turned sidewise, but when tightened holds it in any position desired.

At the side of the piece D are guides $n\ n'$, of which the lower one, $n$, is stationary in the post to hold the gate level; but the other, $n'$, is movable, and may be changed from one hole to another, so as to keep the piece D, and with it the gate, in a slanting position, if desired; or the movable piece D may be placed between two posts fixed in the ground, as shown in Fig. 2, and balanced by a weight over a pulley journaled in the posts; but I prefer one post on account of cheapness, since any well-preserved gate-post already in place can be utilized for the purpose and answers just as well.

It will be understood from the foregoing that by my arrangement a gate may be raised or lowered without difficulty, and held in that position to permit sheep or hogs to pass from one field to another without admitting at the same time cattle or horses, and that in case the gate should sag it can be readjusted by changing the guide from one hole to another; or one or more holes in a vertical line for a bolt to pass through may be used instead of the slot S, although not so convenient.

Having thus described my invention, I claim—

The combination of a fixed gate-post with a slotted bar or piece that is pivoted and upheld by a bolt passing through the post and slotted bar or piece, to which piece the gate is hinged, and can be adjusted to various heights and inclinations by changing the position of the piece to which it is hinged, substantially as described.

In testimony whereof I affix my signature in presence of two witnesses.

EDWIN J. HART.

Witnesses:
LOUIS MOESER,
T. F. LEHMANN.